US008237949B2

(12) United States Patent
Ferlitsch (10) Patent No.: US 8,237,949 B2
(45) Date of Patent: Aug. 7, 2012

(54) SYSTEM AND METHOD FOR COMBINING AT A SINGLE LOCATION SELECTION OF IMAGE FINISHING OPERATIONS OF MULTIPLE DEVICES

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1606 days.

(21) Appl. No.: 10/849,463

(22) Filed: May 18, 2004

(65) Prior Publication Data
US 2005/0259277 A1 Nov. 24, 2005

(51) Int. Cl.
G06K 13/00 (2006.01)
(52) U.S. Cl. ........................................ 358/1.15; 358/1.9
(58) Field of Classification Search ................ 358/1.15, 358/1.9, 3.24–3.25, 1.1; 347/1–109, 111–117, 347/129–151, 171–223, 224–264; 710/241, 710/113, 128; 395/133, 163, 145, 147; 715/527; 707/526, 527, 10, 514, 517
See application file for complete search history.

(56) References Cited

U.S. PATENT DOCUMENTS

| | | | | |
|---|---|---|---|---|
| 5,333,246 A * | 7/1994 | Nagasaka | ...................... | 345/619 |
| 5,991,846 A * | 11/1999 | Ooki | ............................ | 710/241 |
| 6,134,568 A * | 10/2000 | Tonkin | .......................... | 715/209 |
| 2001/0029521 A1 | 10/2001 | Matsuda et al. | | |
| 2001/0038462 A1 | 11/2001 | Teeuwen et al. | | |
| 2002/0112037 A1 | 8/2002 | Koss | | |
| 2002/0126306 A1 | 9/2002 | Chohsa et al. | | |
| 2003/0041274 A1* | 2/2003 | Platteter et al. | ............... | 713/400 |
| 2003/0184789 A1 | 10/2003 | Komaki | | |
| 2004/0068698 A1* | 4/2004 | Wu et al. | ........................ | 715/525 |

(Continued)

FOREIGN PATENT DOCUMENTS
JP 2000-047771 2/2000
(Continued)

OTHER PUBLICATIONS http://v3.espacenet.com/textdoc?DB=PAJ&IDX=JP2002287931 English translation of Abstract of JP 2002 287931, from Esp@cenet.com) May 18, 2004.

(Continued)

*Primary Examiner* — King Poon
*Assistant Examiner* — Iriana Cruz
(74) *Attorney, Agent, or Firm* — Austin Rapp & Hardman (57) ABSTRACT

A system and method for combining at a single location selection of image finishing operations of multiple devices. The system comprises a first memory for storing imaging finishing operations of the source device; a second memory for storing imaging finishing operations of the destination device; a display; and a system processor, coupled to the first memory, the second memory and the display, for producing a representation of both imaging finishing operations of the source device and imaging finishing operations of the destination device, and causing that representation to be presented by the display. The method comprises retrieving from a first memory information regarding imaging finishing operations of the source device; retrieving from a second memory information regarding imaging finishing operations of the destination device; and producing a representation of both imaging finishing operations of the source device and imaging finishing operations of the destination device, and causing that representation to be presented by a display. The system and method may be particularly adapted for pull printing of an image by a printer in communication with a host computer.

19 Claims, 5 Drawing Sheets

U.S. PATENT DOCUMENTS

| | | | | |
|---|---|---|---|---|
| 2004/0160641 A1* | 8/2004 | Kohler et al. | | 358/1.18 |
| 2005/0086394 A1* | 4/2005 | Kitada et al. | | 710/1 |
| 2007/0240042 A1* | 10/2007 | Sato | | 715/527 |

FOREIGN PATENT DOCUMENTS

| | | |
|---|---|---|
| JP | 2000-194639 | 7/2000 |
| JP | 2000-330915 | 11/2000 |
| JP | 2001-014255 | 1/2001 |
| JP | 2001-238020 | 8/2001 |
| JP | 2001-257827 | 9/2001 |
| JP | 2002 287931 | 10/2002 |
| JP | 2002 297330 | 10/2002 |
| JP | 2003-202973 | 7/2003 |
| WO | WO 01/20472 A1 | 3/2001 |

OTHER PUBLICATIONS http://v3.espacenet.com/textdoc?DB=PAJ&IDX=JP2002297330& QPN=JP2002297330 (English translation of Abstract for JP 2002 297330 from Esp@cenet.com) May 18, 2004.

* cited by examiner

SYSTEM AND METHOD FOR COMBINING AT A SINGLE LOCATION SELECTION OF IMAGE FINISHING OPERATIONS OF MULTIPLE DEVICES

BACKGROUND OF THE INVENTION

The present invention relates generally to digital imaging systems and methods, and more particularly to systems and methods for combining the image finishing operations of source and destination devices.

In general, a digitized, electronic image may be captured or otherwise produced by a source device in many different ways and delivered to a destination device for finishing in selected ways. As a typical example, an image may be stored in the memory of a processor that is part of a computer network and delivered as a digital image file by a host computer on that network to a printer that renders the image, prints multiple copies of it and punches the copies for insertion in a binder. In another example, the image may be captured by scanning a hard-copy document from a scanner that is part of a computer network and delivered as a digital image file by a scanning device on that network to a facsimile device that transmits the image to a facsimile destination.

In general, the source may be a scanner, an input facsimile interface, an image store, an electronic whiteboard, or some other special purpose device that generates or stores an image, as well as a general purpose computer. In general, the destination device may be a monitor, an output fax interface, or some other image finishing device, as well as a printer.

As used herein, the term "rendering" refers to the process of producing a digital or raster graphics image from abstract image information, such as vector or 3D computer graphics files, Tag Image File Format ("TIFF") files, Portable Document Format ("PDF"), Joint Photographics Experts Group ("JPEG") File Interchange Format ("JFIF"), or Microsoft Word® files. The term "finishing" refers to the process of producing the final manifestation of the image, which may include such physical operations as printing, punching, sorting, or stapling, image send, image conversion, as well as rendering.

In practice, the source device and the destination device may have distinct respective sets of finishing operation capabilities. For example, a printer may not have the memory to store an image so as to make multiple copies thereof, while a host computer may have the required memory and the applications program running on the host may provide the finishing operation of making multiple copies by sending a document repeatedly to the printer. On the other hand, the applications program on the host may not include half-tone rendering algorithms, while such algorithms and the selection of that operation may be part of the finishing capabilities of the printer.

Many source devices and the destination devices communicate images and finishing instructions in different respective formats and protocols. For example, a host computer may be running Microsoft Word®, which has a proprietary format, while an associated printer is adapted to use Hewlett Packard Printer Control Language ("PCL") or Adobe Postscript® ("PS") formats. To overcome such language barriers, either the host computer or the printer may have format translation capability, such as using a Graphics Device Interface ("GDI") and a corresponding printer driver on a host computer to translate an application file format, for example MS-Word, to a printer ready format, for example into PCL. Nevertheless, the respective finishing operations that the host computer and the printer support may be different.

Perhaps the most common finishing situation is the use of a printer to produce a hard copy of a document obtained from a host computer; in any case, this process serves to illustrate some limitations of conventional approaches to finishing a digital image where the image is provided by a source device, such as the host computer, to a destination device, such as the printer. Many current devices for printing documents are more correctly referred to as imaging devices because they provide a broader set of functions than simply printing that which is sent to them by a source. More specifically, many imaging devices have a display panel and display control processor that display a variety of document retrieval and imaging operations such as print, copy, scan, fax, image send and store. A user interface ("UI") program is executed by the display control interface to display symbols representing operation selections, and operation selection is made by an input device which may be the display screen itself where it is sensitive to touch. The latter type of device is commonly known as a "touch screen." The display control processor is typically programmed in some standard language such as Wireless Markup Language ("WML") or Extensible Hyper-Text Markup Language ("XHTML"), and the instructions for the display of operations and interpretation of selections are typically, though not necessarily, stored in firmware in the imaging device. When a document is to be printed, it must either be in a printer ready format ("PRN"), such as PCL or PS, or in an image format, for example TIFF, that is supported for direct imaging by the printer, or in an engine ready format specific to the printer ("raster"), or be converted to a printer ready or engine ready format, that is compatible with the printer.

One type of operation for an imaging device is to perform "pull printing." That is, a user selects an operation on the control panel of the imaging device to obtain a document from a host computer and print a hard copy of it. This is common where the printer is connected to a network, such as a Local Area Network ("LAN"), along with a host computer. The user need not go physically to the host computer to accomplish the printing task; rather, the user may go directly to the imaging device, enter the document identity and location at the control panel, select desired printing operations, and pick up the document once it is printed.

In one conventional way of pull printing the user is able to locate a PRN file somewhere on the network from the control panel of the printer and select it for printing. In this case, the document must already be rendered; however, the options for printing a pre-rendered document may conflict with the user's desired print options.

In another conventional way of pull printing, the user may locate a document on the network whose file format is supported by the printer for direct submission thereto; that is, the printer can process the native format of the document. At the command of the user, the printer downloads the document in its native format and processes it according to printer specific finishing option settings. In this case, the document cannot be pre-rendered, and only printer specific finishing operations can be selected; there is no ability to emulate finishing capabilities at the source device.

In a further conventional method of pull printing the user selects from the printer a file that is in a native format and the printer sends the file to a host computer on the network along with rendering instructions specific to the printer, accepts the rendered document back from the host in PRN format, and prints the document. In this case, only printer finishing operations can be employed, and those which are selected by the user at the printer must be understood by the host.

What the foregoing examples illustrate is that one thing conventional systems and methods for transferring an image from a source device to a destination device for finishing, particularly transferring an image from a host computer to a printer for printing, have in common is that they are limited to selecting from one location either the finishing operations of the source device or the finishing operations of the destination device, but not both.

SUMMARY OF THE INVENTION

The present invention provides a system for combining at a single location selection of respective image finishing operations of a source device for providing image data and of a destination device for processing image data. The system comprises a first memory for storing image finishing operations of the source device; a second memory for storing image finishing operations of the destination device; a display; and a system processor, coupled to the first memory, the second memory and the display, for producing a representation of both image finishing operations of the source device and image finishing operations of the destination device, and causing that representation to be presented by the display.

The invention also provides a method for combining at a single location selection of respective image finishing operations of a source device for providing image data and of a destination device for processing image data. The method comprises retrieving from a first memory information regarding image finishing operations of the source device; retrieving from a second memory information regarding image finishing operations of the destination device; and producing a representation of both image finishing operations of the source device and image finishing operations of the destination device, and causing that representation to be presented by a display.

In one preferred embodiment, the system and method may be particularly adapted for pull printing of an image by a printer in communication with a host computer.

It is to be understood that this summary is provided as a means of generally determining what follows in the drawings and detailed description of the invention and is not intended to limit the scope of the invention. Moreover, the objects, features and advantages of the invention will be more readily understood upon consideration of the following detailed description of the invention taken in conjunction with the accompanying drawings.

DETAILED DESCRIPTION OF THE INVENTION

In general, the system and method of the present invention may be implemented wherever there is a source device which provides access to a digital image file and a destination device to which the image may be transferred and which implements finishing of the image. The system and method is particularly suitable for implementation where the source device is a host computer and the destination device is an imaging device, typically, though not necessarily, a device for producing a hard copy of an image, but is not limited thereto. Although the system and method are described with respect to several specific embodiments, it is to be understood that the invention is not limited to those embodiments.

According to the present invention, where a destination device, such as an imaging device, is interconnected by a network, such as a LAN or WAN, with one or more host devices, a user may browse the network to locate on a source device connected to the network an image to be printed or otherwise finished by the imaging device. The user may then determine from one location the finishing capabilities of the source device, typically a host computer, and the finishing capabilities of the imaging device, typically a printer, select from a union of those respective capabilities the finishing operations to be implemented, and cause an image to be rendered and produced in the desired manifestation, typically one or more hard copies of a document bearing the rendered image. The browsing may occur at, and the union of finishing capabilities may be displayed and selected from, the imaging device, the host device, or some other location.

Figure 1:
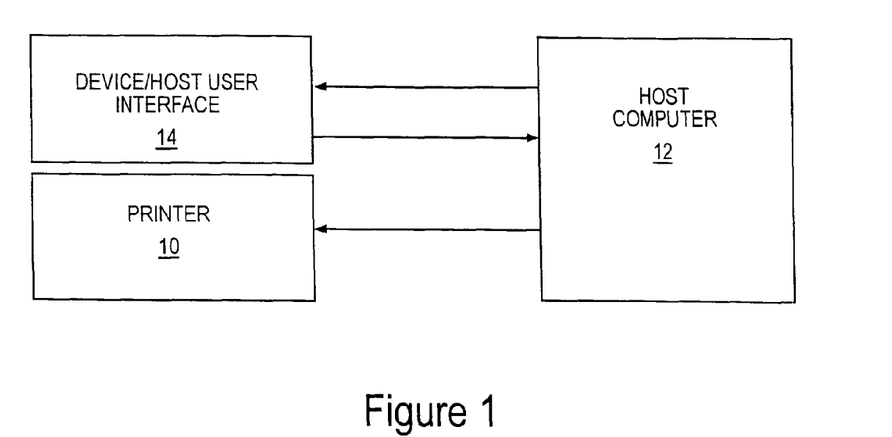
FIG. 1 is a block diagram of a first system according to the present invention.

Referring to FIG. 1, in a first preferred embodiment a system and method according to the present invention a control panel, having both display and selection features, is located on an imaging device, such as printer 10. The control panel may also be accessible remotely, such as from a device embedded web page. The system retrieves from an associated memory the finishing operations that the imaging device is capable of performing. It also retrieves from a source device, such as host computer 12, finishing operations that the source device is capable of performing. It then merges information regarding those respective operations by producing a dynamically-generated user interface ("UI") 14 that displays symbols representing the union of those respective operations. The UI also enables input selection signals to be matched with corresponding operation symbols; preferably, this is accomplished with touch-screen technology wherein the user makes selections by touching that part of the display at which the symbol for the desired operation is located.

Once the user has made a selection of operations for finishing a particular image that has been identified, the system splits the operation selections into imaging device settings and source settings. It then sends back to the host a print request for the image and the identification of at least the host finishing operation selections that are unique to the host. At the request of the system, the host then renders the image in accordance with the selected host finishing operations that it receives, and sends the rendered image to the imaging device. When the imaging device receives the rendered image, the system then causes the imaging device to complete the finishing using the remaining operations that were selected, all of which may be carried out by the imaging device. However, it is to be understood that the display could actually be associated with the source device rather than the imaging device, or could be physically independent of both the source device and the imaging device, and still perform the functions of merging the display and selection of respective finishing operations of the source device and imaging device.

Figure 2:
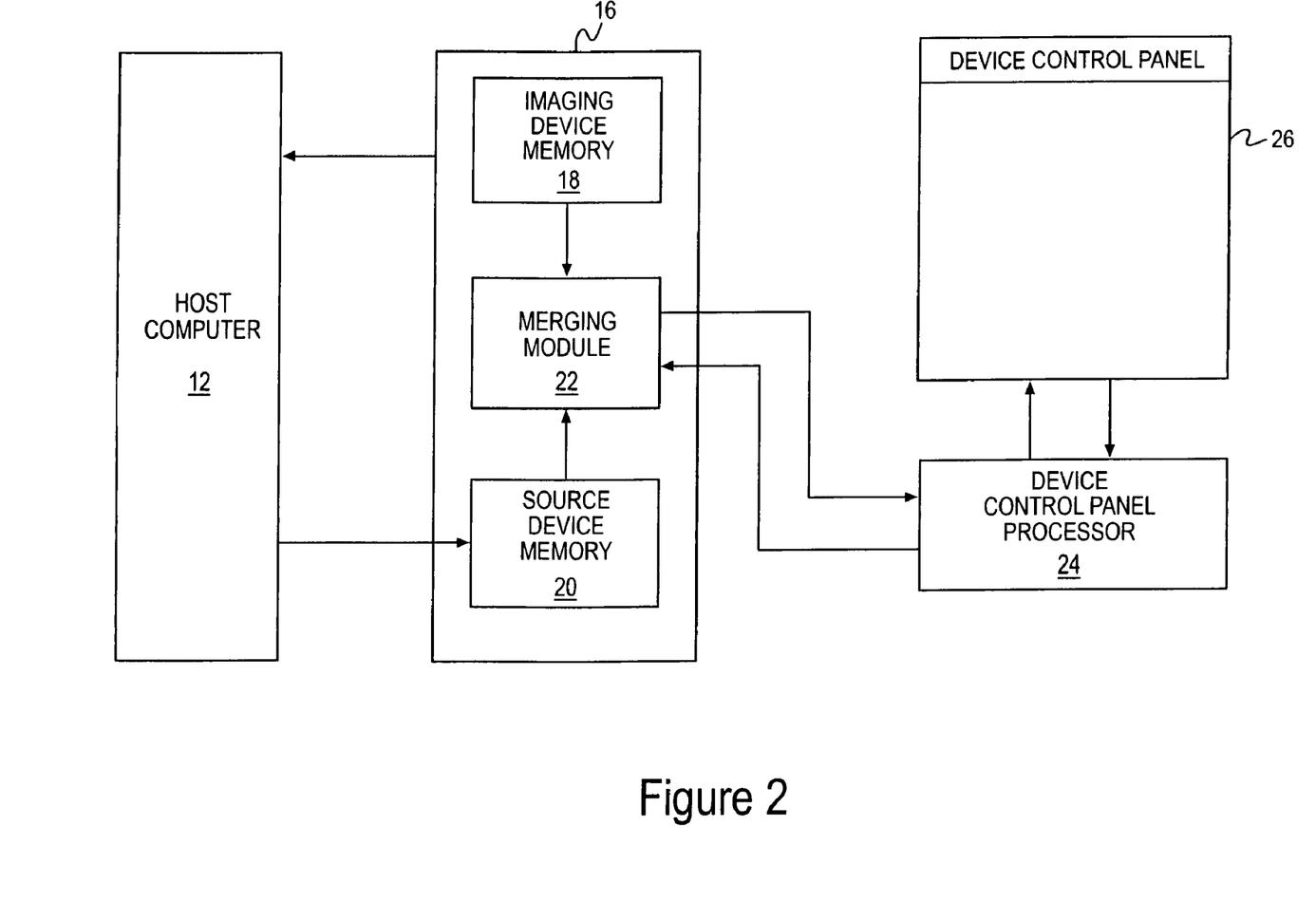
FIG. 2 is a block diagram of a second system according to the present invention.

The physical structure of the first preferred embodiment is shown in FIG. 2, along with a host computer and elements of the imaging device. The system comprises a finishing processor 16 including an imaging device memory 18, for storing the imaging device finishing operation capabilities, a source device memory 20, for storing the finishing operation capabilities of the source device, such as the host computer 12, and a merging module 22, for merging the operations of the source and the imaging device into the union thereof, causing that information to be displayed by generating the UI 14, accepting operation selection inputs, and splitting the operation selections into source and imaging device operations. The finishing processor retrieves the source finishing operation capabilities from the host computer and stores them in the source memory 20. The finishing processor communicates with a device control panel processor 24, which generates the display on the control panel 26, and accepts selection inputs from the control panel. The finishing processor 16, control panel processor 24 and host computer 12 preferably communicate in a common standard display language such as WML.

Alternatively, in a variant of the first embodiment, the system could be associated with the source device, in which case the source device finishing operations would already be stored in the source memory, the finishing processor would retrieve the imaging device finishing operations from the imaging device and store them in the imaging device memory, and the finishing processor would communicate with a source display and input control processor.

Figure 3:
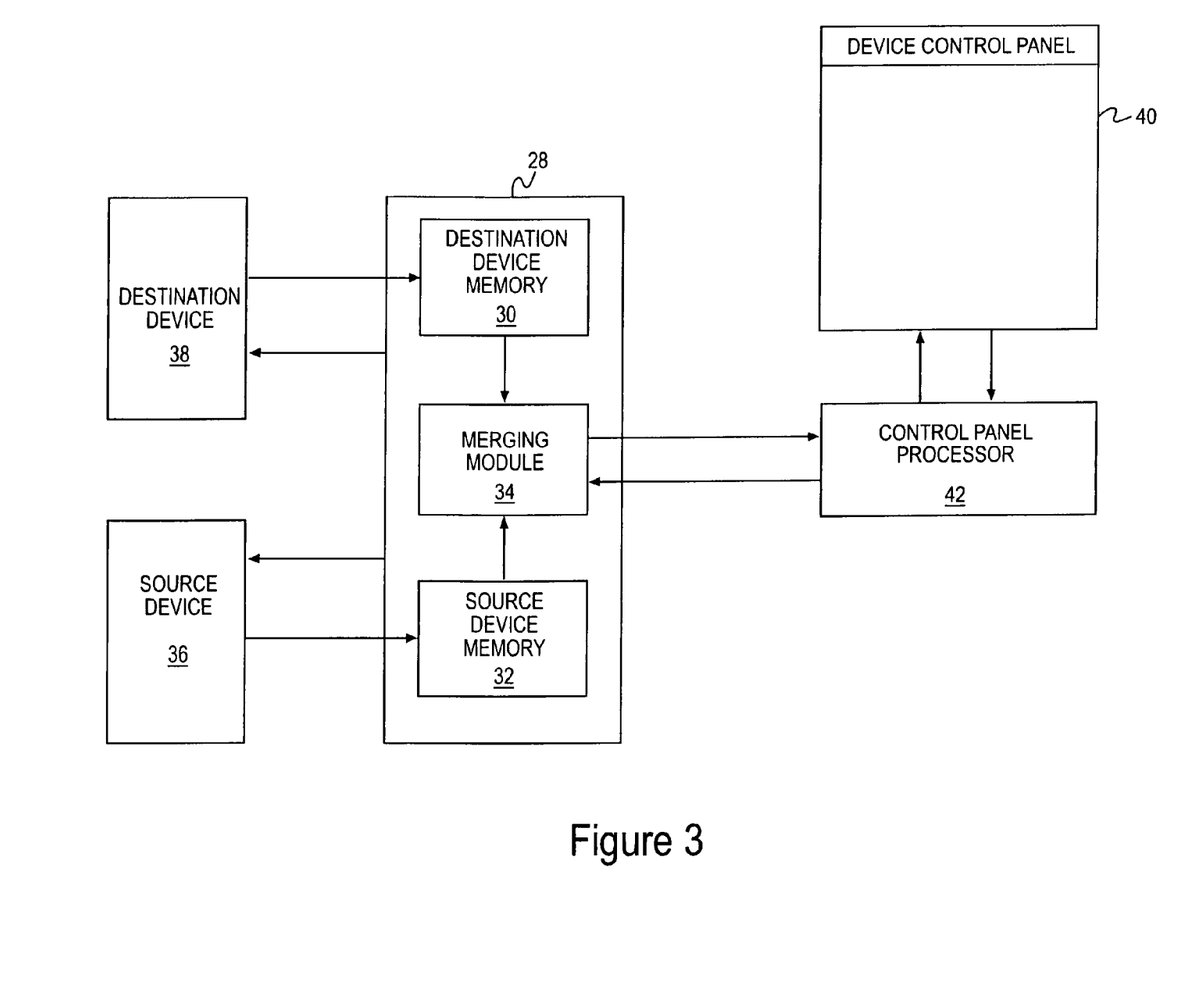
FIG. 3 is a block diagram of a third system according to the present invention.

A second preferred embodiment is shown in FIG. 3. In this case, a finishing processor 28, which comprises a destination device memory 30, a source device memory 32, and a merging module 34, is physically separate from a source device 36 and a destination device 38. A control panel 40 and control panel processor 42 are physically located with the finishing processor 28. Each of these elements perform the same functions as their corresponding elements in the first preferred embodiment, except that the finishing operation capabilities must be retrieved from both the source device and the destination device and stored in respective memories, and print requests and selected operations must be sent to both the source device and the destination device.

Figure 4:
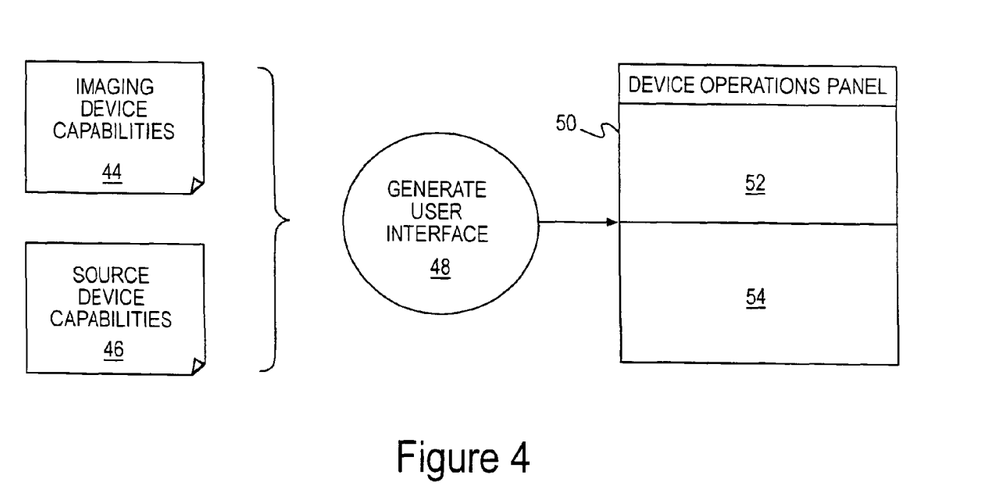
FIG. 4 is a diagram of a first process according to the present invention.

Turning to FIG. 4, a preferred embodiment of the method of the present invention retrieves the imaging device capabilities 44, retrieves the source device capabilities 46, and generates a UI 48 by merging those capabilities into a union thereof. The user interface is then displayed at a control panel 50. Preferably, a set of symbols representing the finishing operation capabilities of the imaging device is displayed in one part 52 of the control panel, and another set of symbols representing the finishing operation capabilities of the source device is displayed in another part 54 of the control panel. However, the symbols may also be arranged in some other convenient manner without departing from the principles of the invention.

A finishing processor 16 or 28 includes hardware and software means for communicating with a host, as will be readily understood by a person skilled in the art, so as to obtain the finishing capabilities of the source, for example, booklet printing, copy collation, watermark printing and the like. The source capabilities are then sent back to the finishing processor device over a communication protocol in a format recognizable by the destination, for example Transmission Control Protocol Internet Protocol ("TCP/IP"), and stored in the source memory.

Some appropriate means is provided for identifying requests and responses and associating them with a given image to be finished. For example, an identification code may be embedded with a request for source capabilities, and the identification code may be embedded in the source response to the destination device and associated with the image, as will be understood by a person skilled in the art. Alternatively, a process within the source for generating source finishing capabilities may be associated with a specific source port so that when the source receives a request to send finishing capabilities, it recognizes the request and what process within the source to route it to by the port number. Likewise, the process within the finishing processor (typically, though not necessarily, within the destination device) for receiving finishing capabilities may be associated with a specific port so that when the finishing processor receives the source finishing capabilities, it recognizes the response and what process within the finishing processor to route it to by the port number. The data format exchanged between the source and the destination device, and the finishing processor where it is not part of the destination device, may be any format that is recognizable by the respective processes, for example, Extensible Markup Language ("XML"). As another example, it may be a proprietary format in plain text, such as a format where each rendering capability is specified by an mneumonic name and one or more mneumonics for associated printer settings.

The finishing processor retrieves from the destination memory the destination device finishing capabilities, for example, stapling, hole punching, tray selections and the like, and retrieves from the source memory the source capabilities. These capabilities are then merged to produce the UI.

Figure 5:
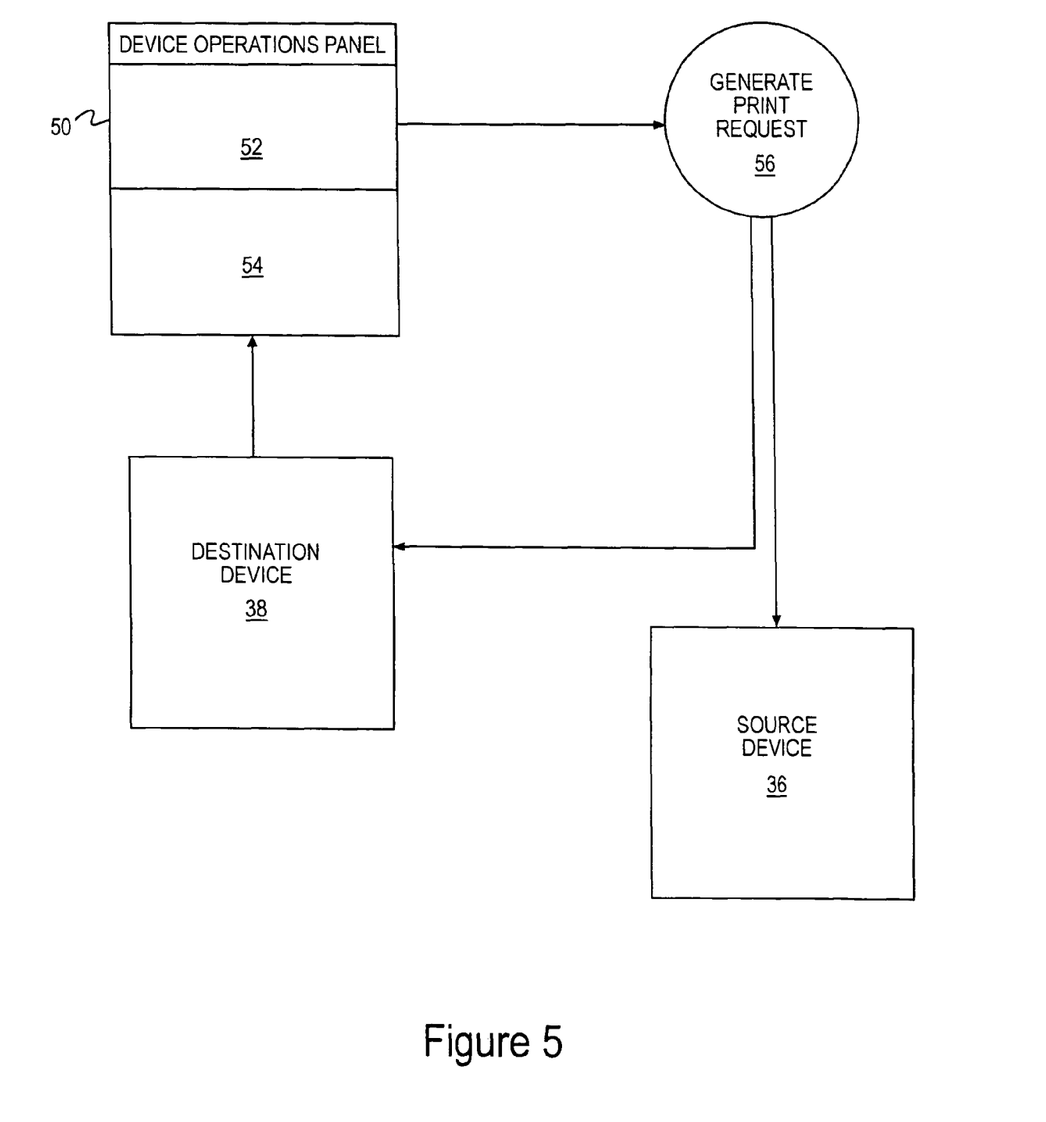
FIG. 5 is a diagram of a second process according to the present invention.

Turning now to FIG. 5, once the UI has been created, the user selects one or more finishing settings from the UI 52, 54. For example, in the case of a destination device that is a printer that includes the finishing processor, a source that is a host computer on a network, and the process of selecting a document at the printer and downloading it from the host to be printed ("pull printing"), the user selects one or more print settings at the control panel of the printer. If more than one document is selected for printing, the settings can be applied to all of the documents, or can be applied on a single or document group basis.

Once the user has selected the print settings and initiates the print job, a generate finishing, or print request, process 56 splits the finishing settings into two groups: source, or host computer, finishing settings and destination, or printer, finishing settings. When a setting can apply to both the source and the destination devices, the generate print request process may use any appropriate means of assigning the setting to either the source device or destination device, for example, using a predetermined preference or a preference determined dynamically as by considering performance characteristics.

Once the print settings have been assigned, the generate print request communicates with the source finishing process, for example using a data protocol over TCP/IP, the intent to initiate a finishing job. The finishing request contains at least the identification of the images to be finished and the source finishing settings. The methods for identifying the images, or documents, may include, but are not limited to, location of the image on the source; location of the image and the means to retrieve it from another source; and retrieving the image data from a secondary source, or from the destination device, and sending the image to the host whose finishing capabilities are to be used.

The destination side settings are retained and stored so that they can later be retrieved by the destination device, or printer, for example in a random access memory, flash memory or hard disc. They are also stored so that they are associated with the print request. For example, the network path name of the image and the host network address where the image is located may be stored with the device side print settings.

Figure 6:
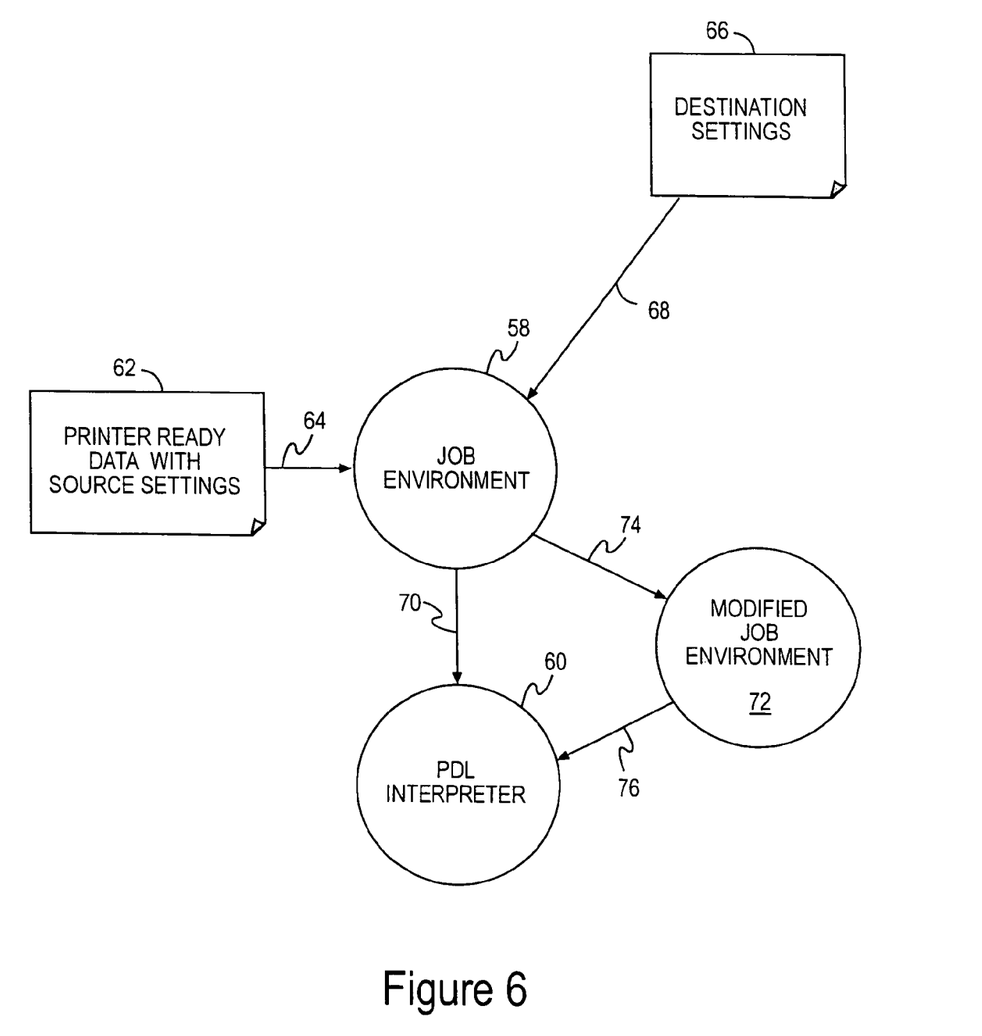
FIG. 6 is a diagram of a third process according to the present invention.

Implementing the finishing process is represented by FIG. 6. This includes either partially finishing the image at the source, or host, and complete finishing of the image at the destination, or imaging device. In FIG. 6, the pertinent processes of the destination device are represented by the Job Environment 58 and the Page Description Language ("PDL") Interpreter 60. The Job Environment 58 is the repository of the finishing settings to be applied to the print job. The Job Environment 58 is initialized to the default settings of the imaging device. The finishing settings of the source in the printer ready data 62, if any, are applied to the Job Environment 58, as shown by arrow 64. Destination device finishing settings 66 are also applied to the Job Environment, as shown by arrow 68. The application of the source 62 and destination finishing settings 66 to the Job Environment 58 produces the Modified Job Environment 72, as shown by arrow 74. The printer ready data 62, together with remaining finishing settings from the Modified Job Environment 72, are processed by the PDL Interpreter 60 for implementing the final imaging, such as printing a document, as shown by arrow 76.

In the case of partial finishing at the source, upon receipt of a print request from the finishing processor the source finishing process parses the message to determine, among other things, what image is to be finished and what settings to use. The source finishing process then finishes the image according to the source finishing settings. For example, in the case of a printer and a host computer, the host process may initiate a background print to the printer using an application associated with a document format as in Microsoft Windows®. Source print settings, for example booklet order, could then be passed to the background print task. Alternatively, one or more of the source finishing settings could be applied after the background print, but before being sent to the printer, such as by a despooling process in the source's print subsystem, or on another, intermediate host. In either case, the resulting printer ready data 62 and remaining source finishing settings are applied with the destination finishing settings 66 to produce the Modified Job Environment 72. The PDL interpreter 60 in conjunction with the Modified Job Environment 72 renders the printer ready data into the final output.

Alternatively, the image or document data may be sent in its native format to the destination device. One or more source or finishing settings for a rendering capability that is to be emulated on the destination device may be included with the image, or document, data. For example, if the source, or host, rendering operation is booklet production and the image format is TIFF, the host could partially perform the booklet rendering by reordering the images into booklet order and indicating to the destination, or imaging, device to complete the booklet rendering by providing the destination with modified TIFF data indicating that the images are to be finished, or printed, in duplex and 2-up.

When a destination, or imaging, device, receives a finishing job from a source, it must determine whether the job was initiated at the source, at the destination device or at a control panel located elsewhere, the latter two cases of which are commonly referred to as "pull print" jobs.

An imaging, destination device may determine this by any effective process. For example, when the finishing job is initiated at the destination device, the destination device may assign a unique job identifier, which is sent to the source along with the source finishing settings, and stored with the destination finishing settings on the destination device. The resulting partially finished job retrieved, or sent, from the source to the destination device, contains the unique job identifier. The destination device then uses the unique job identifier to identify the destination finishing settings to complete the rendering of the image.

Another method to identify the destination settings uniquely with the partially finished job from the host is to match the Internet Protocol ("IP") address, of the host that despooled the finishing job to the imaging device as an index to identify the pull print job. Yet another such process is to parse the finishing job to extract a document name to identify the pull print job. For example, the host could add a non-executing statement or a job control statement to identify the network pathname of the document to be finished, so that the pathname can be used as and index to identify the finishing job.

If a pull print job is identified, then the imaging device retrieves from the destination memory the destination finishing settings associated with the identified finishing job. The imaging device then reconfigures the processing of the finishing job according to the destination device finishing settings combined with any remaining source finishing settings as if they had been specified by the finishing job. For example, where the parameter settings in various imaging device subsystems are pre-specified, the new pull print job would force an override of those settings where they conflict with the settings associated with the finishing job. As another example, the imaging device finishing settings may be embedded in imaging device print commands within the finishing job, in the appropriate print language syntax and location. The imaging device then processes the pull print job.

Although it has been assumed, in the forgoing description of the invention, that the application program on a source device, for example Microsoft Word® on a host computer, employees a different image format than the destination device, such as a printer that uses PCL, so that translation into a common format like GDI is needed to interface between the source and destination devices, the destination device can also be adapted with subsystems that understand many different application program formats. Accordingly, the method and system described herein can be adapted to work with the spooling and despooling subsystems of, for example, Microsoft Windows®, Apple Macintosh®, Linux®, UNIX, Sun Solaris®, HP/UX®, IBM AIX®, and other operating systems without departing form the principles of the invention.

It is also to be understood that the imaging device may finish an image in electronic, as well as physical, form, for example as a fax, and that it may operate on an image from any source, for example a scanner, a photocopier or a document management system. The source device may be any of a variety of digital image source devices, for example a personal computer, a mini- or mainframe computer, a thin client such as a Personal Digital Assistant ("PDA"), or a remote device connected to the Internet. The Destination, or imaging, device may also be any of a variety of digital image finishing devices, for example a hard-copy printer, a multi-functional peripheral, a scanner, a facsimile device, and electronic whiteboard, or a document server.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims which follow.

What is claimed is:

1. A method for finishing a digital image, the method comprising:

retrieving an image to be finished from a source device, wherein retrieving the image is initiated by an imaging device;

retrieving a first set of finishing operations from the imaging device, wherein the first set of finishing operations comprises one or more finishing operations that the imaging device is capable of performing;

retrieving a second set of finishing operations from the source device, wherein the second set of finishing operations comprises one or more finishing operations that the source device is capable of performing;

producing a dynamically generated user interface (UI) that comprises a control panel;

displaying a first set of symbols in a first part of the control panel, wherein the first set of symbols represents the first set of finishing operations;

displaying a second set of symbols in a second part of the control panel, wherein the second set of symbols represents the second set of finishing operations;

displaying symbols representing a union of the first set of finishing operations and the second set of finishing operations;

receiving a selection of finishing operations from the user via the UI;

splitting the selection of finishing operations into a third set of finishing operations to be performed by the imaging device and a fourth set of finishing operations to be performed by the source device, wherein splitting the selection of finishing operations comprises identifying at least one finishing operation that can be performed by both the imaging device and the source device, and selecting, for each finishing operation that can be performed by both the imaging device and the source device, either the imaging device or the source device to perform the finishing operation;

sending a finishing request to the source device, wherein the finishing request comprises the fourth set of finishing operations;

receiving a rendered image from the source device finished according to the fourth set of finishing operations; and completing the finishing of the rendered image using the third set of finishing operations.

2. The method of claim 1, wherein the image to be finished has not been rendered.

3. The method of claim 1, further comprising browsing a network to locate the image to be finished.

4. The method of claim 1, wherein the method is performed by the imaging device.

5. The method of claim 1, wherein the method is performed by a finishing processor, wherein the finishing processor is not part of the imaging device.

6. The method of claim 1, wherein producing a dynamically-generated UI comprises merging the first set of finishing operations and the second set of finishing operations.

7. A device for finishing a digital image, the device comprising:

a processor;

memory in electronic communication with the processor; and instructions stored in the memory, the instructions being executable by the processor to:

retrieve an image to be finished from a source device, wherein retrieving the image is initiated by an imaging device;

retrieve a first set of finishing operations from an imaging device, wherein the first set of finishing operations comprises one or more finishing operations that the imaging device is capable of performing;

retrieve a second set of finishing operations from a source device, wherein the second set of finishing operations comprises one or more finishing operations that the source device is capable of performing;

produce a dynamically generated user interface (UI) that allows a user to select at a single location any of the finishing operations in the first set of finishing operations or the second set of finishing operations and displaying symbols representing a union of the first set of finishing operations and the second set of finishing operations;

produce a dynamically generated user interface (UI) that comprises a control panel;

display a first set of symbols in a first part of the control panel, wherein the first set of symbols represents the first set of finishing operations;

display a second set of symbols in a second part of the control panel, wherein the second set of symbols represents the second set of finishing operations;

display symbols representing a union of the first set of finishing operations and the second set of finishing operations;

receive a selection of finishing operations from the user via the UI;

split the selection of finishing operations into a third set of finishing operations to be performed by the imaging device and a fourth set of finishing operations to be performed by the source device, wherein splitting the selection of finishing operations comprises identifying at least one finishing operation that can be performed by both the imaging device and the source device, and selecting, for each finishing operation that can be performed by both the imaging device and the source device, either the imaging device or the source device to perform the finishing operation;

send a finishing request to the source device, wherein the finishing request comprises the fourth set of finishing operations;

receive a rendered image from the source device finished according to the fourth set of finishing operations; and complete the finishing of the rendered image using the third set of finishing operations.

8. The device of claim 7, wherein the image to be finished has not been rendered.

9. The device of claim 7, wherein the instructions are further executable to browse a network to locate the image to be finished.

10. The device of claim 7, wherein the device is the imaging device.

11. The device of claim 7, wherein producing a dynamically-generated UI comprises merging the first set of finishing operations and the second set of finishing operations.

12. The method of claim 1, wherein if multiple finishing operations are identified that either the imaging device or the source device can perform, the imaging device is selected to perform at least one of the multiple finishing operations and the source device is selected to perform at least one of the multiple finishing operations.

13. The method of claim 1, wherein the selection of either the imaging device or the source device to perform a particular finishing operation is based on a predetermined preference.

14. The method of claim 1, wherein the selection of either the imaging device or the source device to perform a particular finishing operation is based on performance characteristics.

15. The method of claim 1, further comprising assigning a unique job identifier to the finishing request, wherein the imaging device uses the unique job identifier to identify the third set of finishing operations.

16. The device of claim 7, wherein if multiple finishing operations are identified that either the imaging device or the source device can perform, the imaging device is selected to perform at least one of the multiple finishing operations and the source device is selected to perform at least one of the multiple finishing operations.

17. The device of claim 7, wherein the selection of either the imaging device or the source device to perform a particular finishing operation is based on a predetermined preference.

18. The device of claim 7, wherein the selection of either the imaging device or the source device to perform a particular finishing operation is based on performance characteristics.

19. The device of claim 7, wherein the instructions are also executable to assign a unique job identifier to the finishing request, and wherein the imaging device uses the unique job identifier to identify the third set of finishing operations.

* * * * *